US012732527B2

(12) United States Patent
Mattison et al.

(10) Patent No.: US 12,732,527 B2
(45) Date of Patent: Sep. 8, 2026

(54) ADAPTIVE SYSTEM FOR DYNAMIC SECURITY EXPOSURE ASSESSMENT

(71) Applicant: BANK OF AMERICA CORPORATION, Charlotte, NC (US)

(72) Inventors: Paul Mattison, Sherrills Ford, NC (US); Najla N. Bailey, Charlotte, NC (US); Kelly Ann Galligan Davila, Charlotte, NC (US); Julie Tettmar, Matthews, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 79 days.

(21) Appl. No.: 18/768,645

(22) Filed: Jul. 10, 2024

(65) Prior Publication Data

US 2026/0019441 A1 Jan. 15, 2026

(51) Int. Cl.
*H04L 29/00* (2006.01)
*H04L 9/40* (2022.01)

(52) U.S. Cl.
CPC ................................ *H04L 63/1433* (2013.01)

(58) Field of Classification Search
CPC .................................................. H04L 63/1433
See application file for complete search history.

(56) References Cited

U.S. PATENT DOCUMENTS 9,507,946 B2 * 11/2016 Bang ...................... G06F 21/52
11,068,615 B2 * 7/2021 Levy .................... G06N 3/0675
11,087,014 B2 * 8/2021 Levy ....................... H04L 41/22
11,336,673 B2 * 5/2022 Nunes ................ G06Q 10/0635
12,192,364 B1 * 1/2025 Mullaney .............. H04L 9/3213
12,363,156 B1 * 7/2025 Thompson ............ H04L 9/3213
2014/0122163 A1 * 5/2014 Simpson .............. G06Q 10/067 705/7.28
2015/0033341 A1 * 1/2015 Schmidtler ............ G06N 20/10 726/23
2016/0134654 A1 * 5/2016 Ghent ................. G06F 16/9024 707/800
2016/0300065 A1 * 10/2016 Bang ....................... G06F 21/52
2017/0154391 A1 * 6/2017 Watkins ................. G06Q 50/18
2017/0374092 A1 * 12/2017 Carter ................... G06F 16/248
2018/0219891 A1 * 8/2018 Jain ..................... H04L 63/1425
2019/0319945 A1 * 10/2019 Levy ..................... H04L 63/205
2019/0319961 A1 * 10/2019 Levy ................... H04L 63/1433

(Continued)

FOREIGN PATENT DOCUMENTS

CN 113706040 A * 11/2021 ........... G06F 18/214
CN 114265938 B * 12/2024

*Primary Examiner* — Don G Zhao

(74) *Attorney, Agent, or Firm* — Moore & Van Allen PLLC; Nicholas C. Russell

(57) ABSTRACT

Systems, computer program products, and methods are described herein for dynamic security exposure assessment. The present disclosure is configured to query a variety of public and private sources to capture relevant exposure information about a third party. Machine learning models analyze this information to identify key exposure vectors. Based on these vectors, an exposure assessment model is dynamically generated and deployed within the third party's network environment to evaluate their security posture. This approach enables real-time, comprehensive assessment of third-party security exposures by integrating advanced data aggregation and machine learning techniques.

17 Claims, 5 Drawing Sheets

(56) References Cited

U.S. PATENT DOCUMENTS

| | | | | |
|---|---|---|---|---|
| 2019/0319971 | A1* | 10/2019 | Levy | H04L 63/0807 |
| 2019/0319980 | A1* | 10/2019 | Levy | H04L 63/0861 |
| 2019/0319987 | A1* | 10/2019 | Levy | H04L 63/08 |
| 2020/0387752 | A1* | 12/2020 | Kursun | G06N 3/09 |
| 2020/0389470 | A1* | 12/2020 | Kursun | G06N 3/08 |
| 2021/0026835 | A1* | 1/2021 | Pai | G06F 40/169 |
| 2021/0049455 | A1* | 2/2021 | Kursun | G06F 18/213 |
| 2021/0049456 | A1* | 2/2021 | Kursun | G06F 18/23 |
| 2021/0209604 | A1* | 7/2021 | Wang | G06Q 20/40 |
| 2021/0326467 | A1* | 10/2021 | Levy | H04L 9/3213 |
| 2022/0407882 | A1* | 12/2022 | Neuvirth | H04L 63/1441 |
| 2023/0214925 | A1* | 7/2023 | Cella | G06Q 30/06 705/37 |
| 2023/0396635 | A1* | 12/2023 | Hebbagodi | H04L 63/1466 |
| 2024/0127252 | A1* | 4/2024 | Loganathan | G06Q 20/0655 |
| 2024/0223607 | A1* | 7/2024 | Weber | H04L 63/1425 |
| 2024/0256663 | A1* | 8/2024 | Thompson | G06F 21/554 |
| 2024/0257010 | A1* | 8/2024 | Sakar | G06Q 30/0185 |
| 2024/0283639 | A1* | 8/2024 | Thompson | H04L 9/3239 |
| 2024/0283811 | A1* | 8/2024 | Thompson | H04L 63/1433 |
| 2025/0045446 | A1* | 2/2025 | Monnig | G06F 21/32 |
| 2025/0181728 | A1* | 6/2025 | Myers | G06F 21/552 |
| 2025/0272689 | A1* | 8/2025 | Todd | G06Q 20/4016 |

* cited by examiner 130
106
112
114
108
104
111
116
102

ADAPTIVE SYSTEM FOR DYNAMIC SECURITY EXPOSURE ASSESSMENT

TECHNOLOGICAL FIELD

Example embodiments of the present disclosure relate to an adaptive system for dynamic security exposure assessment.

BACKGROUND

The security exposure assessment process for financial institutions often involves the use of exposure factor questionnaires provided to third parties. These questionnaires are designed to evaluate potential security exposures and the effectiveness of controls in place to mitigate such exposures. Historically, these question sets have been static, frequently containing outdated queries that do not reflect the rapidly evolving technological landscape. Additionally, the questions may lack specificity regarding the unique relationships between financial institutions and third parties, such as contractual obligations and regulatory disclosures. This static approach to exposure assessment is inadequate in the modern context where exposure vectors are continuously changing and public disclosures by third parties are a critical component of maintaining current security protocols.

Applicant has identified several deficiencies and problems associated with dynamic security exposure assessment. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for an adaptive system for dynamic security exposure assessment.

In one aspect, a system for dynamic security exposure assessment is presented. The system comprising: a data aggregation subsystem configured to: query public and private sources associated with a third party; and capture exposure information associated with the third party based on at least the querying; a machine learning (ML) subsystem operatively coupled to the data aggregation subsystem, and configured to: deploy an ML model on the captured exposure information; determine, using the ML model, a set of exposure vectors for the third party based on at least the exposure information; and an exposure assessment subsystem operatively coupled to the ML subsystem, and configured to: dynamically generate an exposure assessment model for the third party based on at least the set of exposure vectors; deploy the exposure assessment model on a network environment associated with the third party; and determine an exposure assessment of the third party.

In some embodiments, a security control subsystem operatively coupled to the exposure assessment subsystem is presented. The security control subsystem is configured to: determine security controls for the third party based the set of exposure vectors; determine whether the exposure assessment of the third party meets the security controls; and validate the third party for onboarding in an instance in which the exposure assessment meets the security controls.

In some embodiments, the public sources comprise regulatory filings and disclosures, publicly available databases, industry reports and publications, news and media outlets, third-party disclosures, and web scraping sources.

In some embodiments, the private sources comprise at least one of internal databases or private exposure intelligence feeds.

In some embodiments, the data aggregation subsystem is further configured to aggregate and integrate the captured exposure information from the public and private sources into a unified dataset.

In some embodiments, the data aggregation subsystem is further configured to: execute data pre-processing techniques on the captured exposure information, wherein the data pre-processing techniques comprises at least one of data normalization, data cleaning, or data transformation, thereby ensuring data consistency across the unified dataset; categorize and tag the pre-processed exposure information based on predefined criteria, wherein the predefined criteria comprise at least one of a type of exposure, severity of exposure, or source reliability; and store the pre-processed and categorized data in a structured format.

In some embodiments, the ML subsystem is further configured to continuously update the ML model based on new exposure information captured by the data aggregation subsystem.

In some embodiments, a notification subsystem is presented. The notification subsystem is configured to: transmit control signals configured to cause a computing device associated with a user to display an alert indicating changes in the exposure assessment of the third party.

In some embodiments, the ML subsystem is further configured to use natural language processing (NLP) techniques to analyze textual data from the public and private sources.

In some embodiments, the data aggregation subsystem is further configured to periodically re-query the public and private sources to update the captured exposure information.

In some embodiments, the exposure assessment subsystem is further configured update an existing exposure assessment model associated with the third party with the dynamically generated exposure assessment model.

In another aspect, a computer program product for dynamic security exposure assessment is presented. The computer program product comprising a non-transitory computer-readable medium comprising code configured to cause an apparatus to: query public and private sources associated with a third party; capture exposure information associated with the third party based on at least the querying; deploy an ML model on the captured exposure information; determine, using the ML model, a set of exposure vectors for the third party based on at least the exposure information; dynamically generate an exposure assessment model for the third party based on at least the set of exposure vectors; deploy the exposure assessment model on a network environment associated with the third party; and determine an exposure assessment of the third party.

In yet another aspect, a method for dynamic security exposure assessment is presented. The method comprising: querying public and private sources associated with a third party; capturing exposure information associated with the third party based on at least the querying; deploying an ML model on the captured exposure information; determining, using the ML model, a set of exposure vectors for the third party based on at least the exposure information; dynamically generating an exposure assessment model for the third party based on at least the set of exposure vectors; deploying the exposure assessment model on a network environment associated with the third party; and determining an exposure assessment of the third party.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
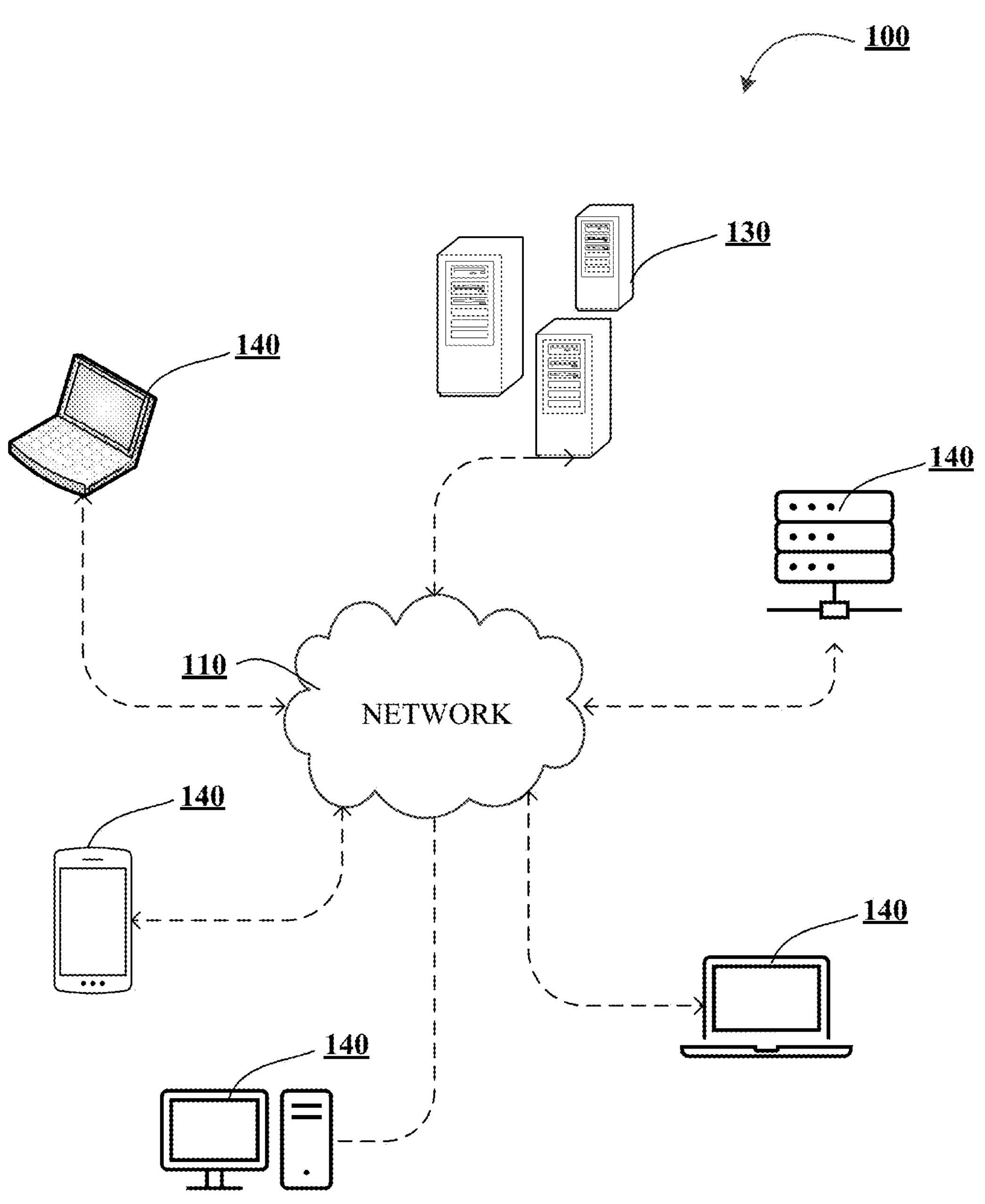
Figure 1B:
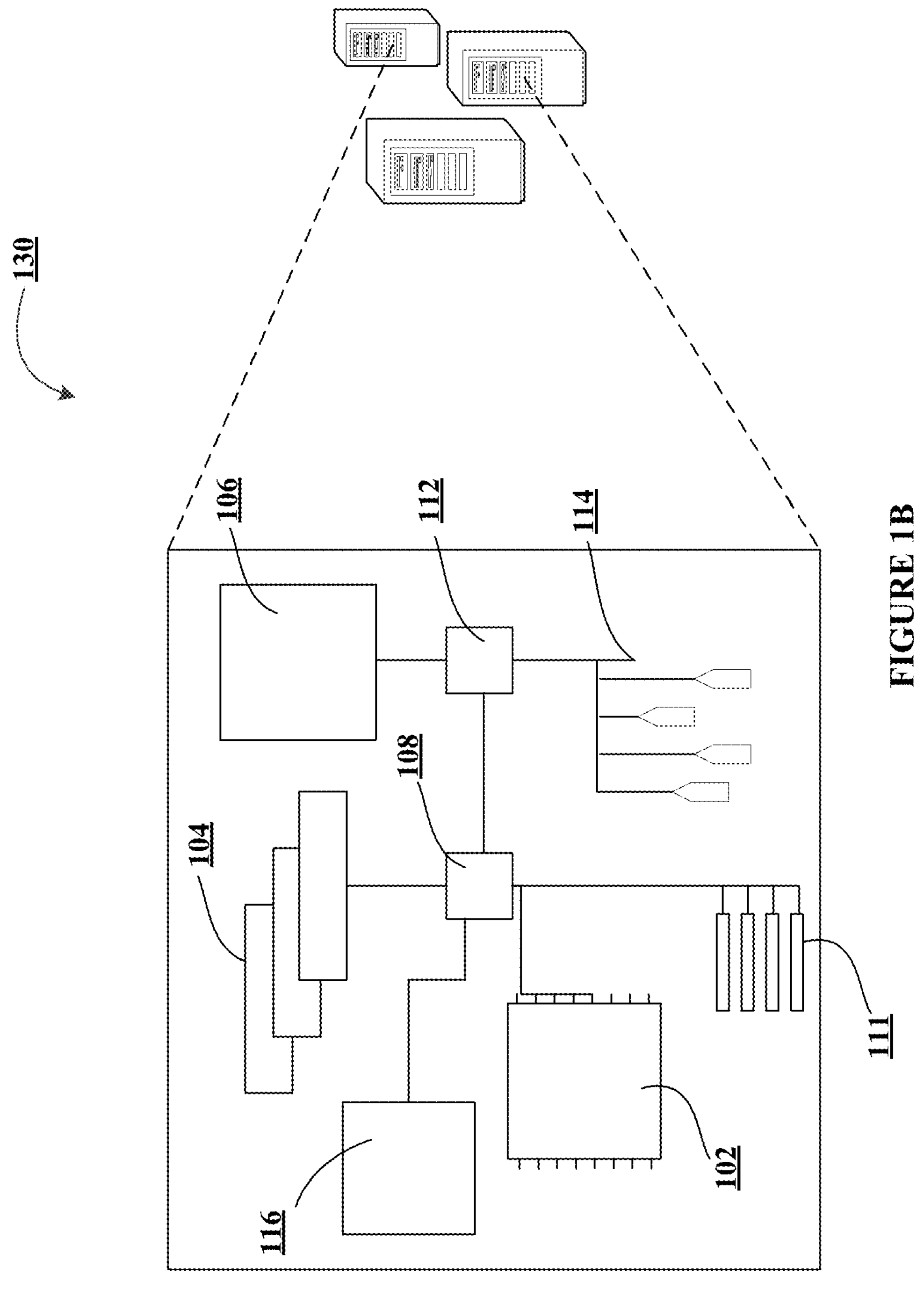
Figure 1C:
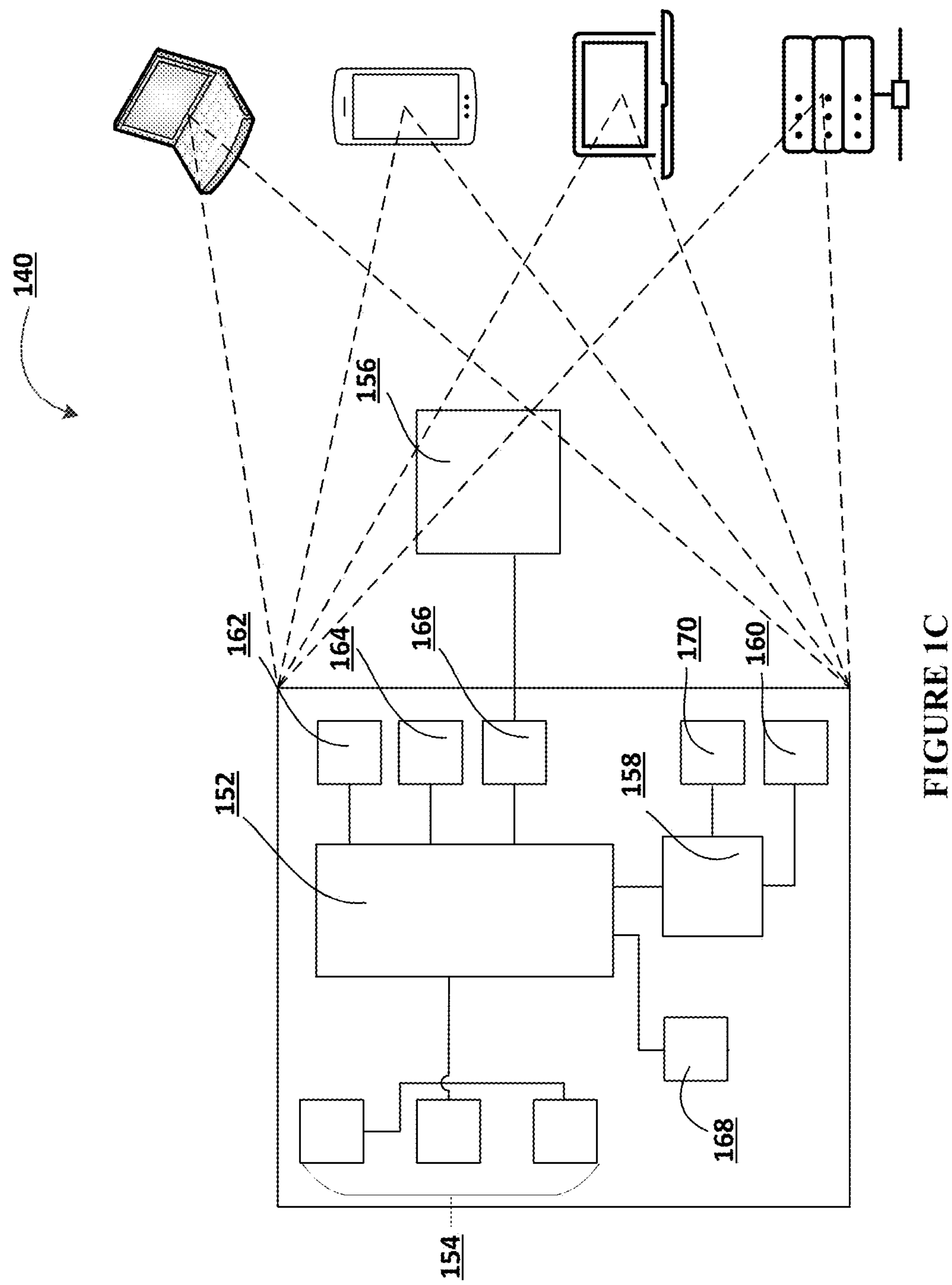
Figure 2:
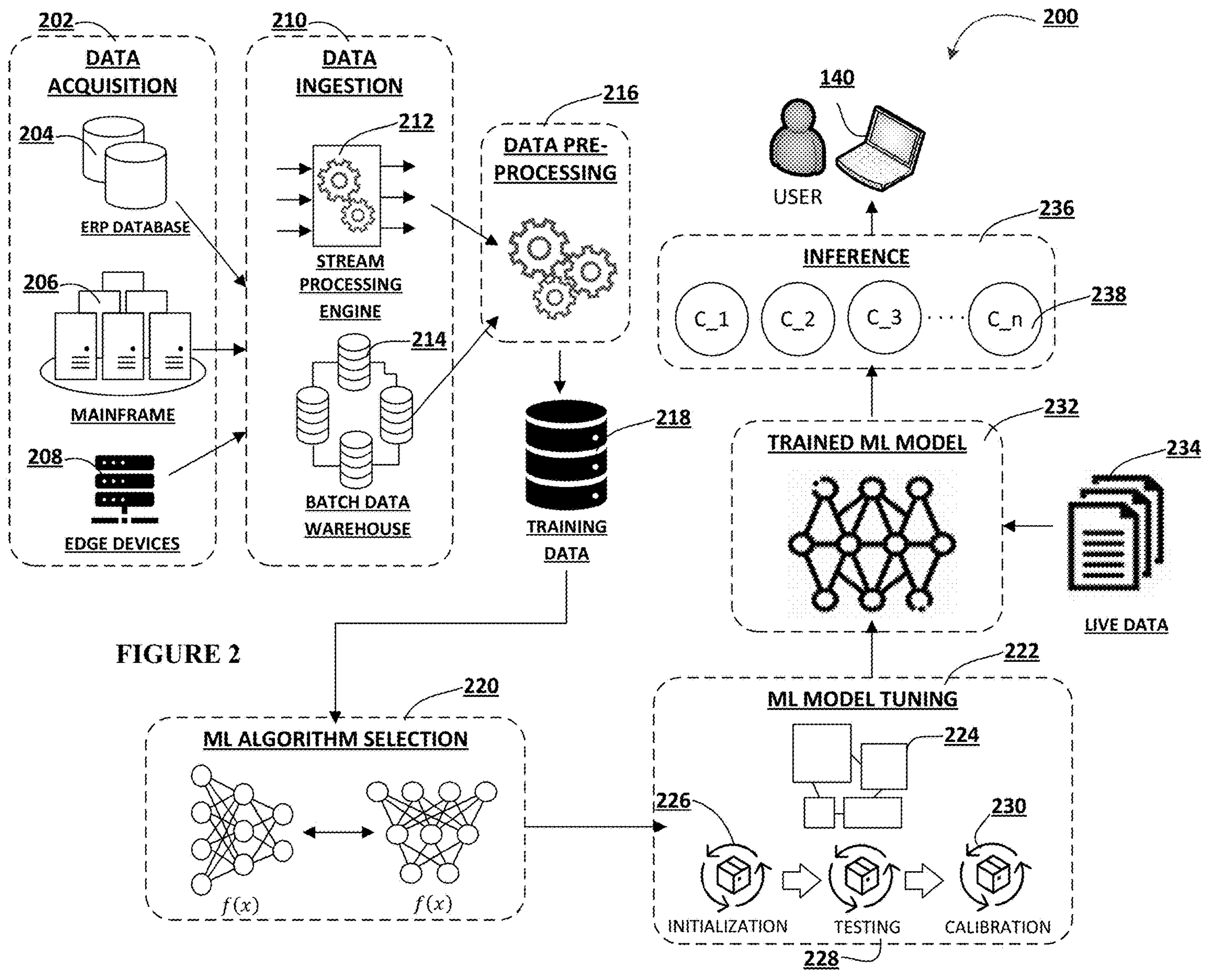
Figure 3:
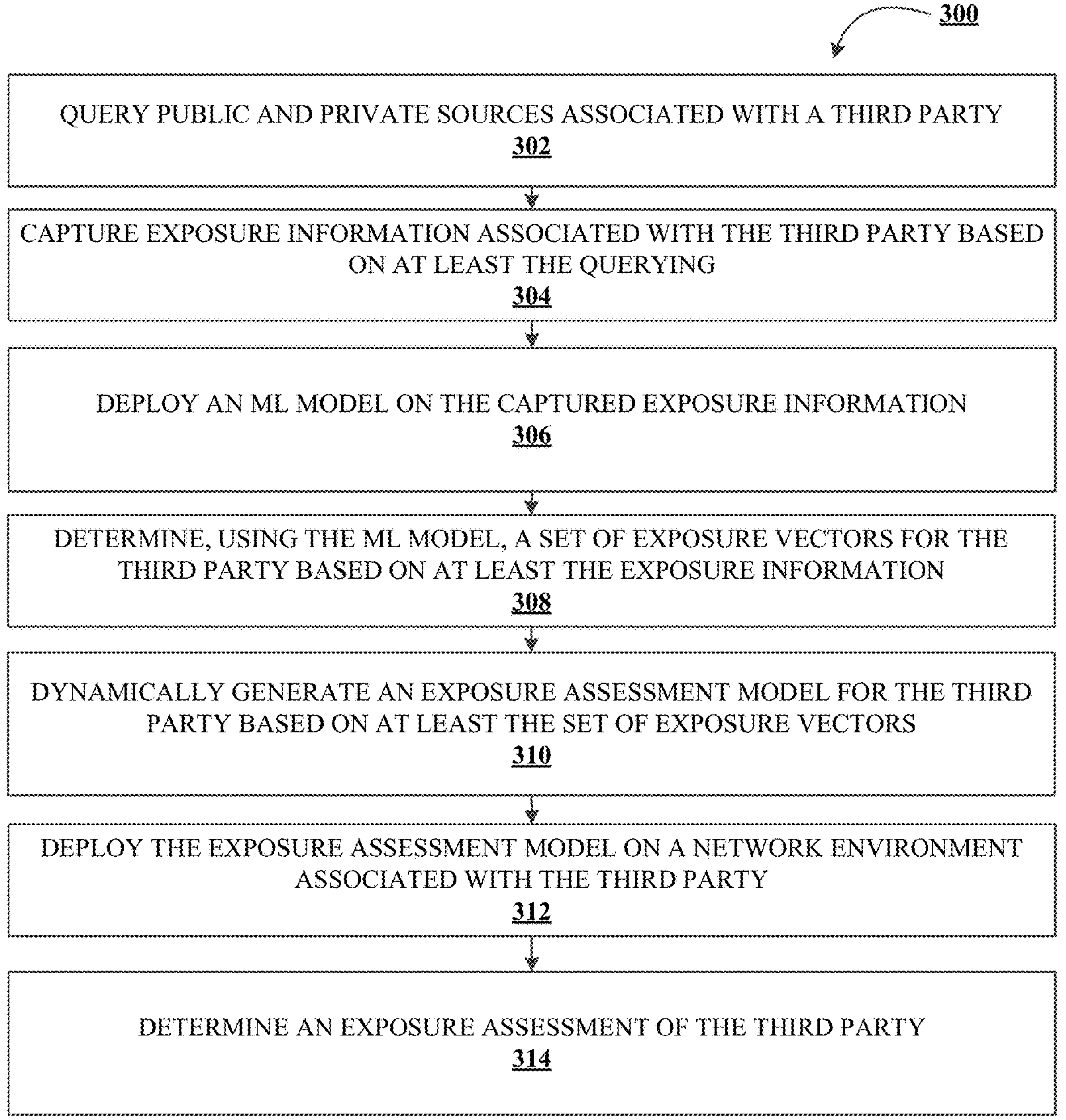

FIGS. 1A-1C illustrate technical components of an exemplary distributed computing environment for adaptive system for dynamic security exposure assessment, in accordance with an embodiment of the invention;

FIG. 2 illustrates an exemplary machine learning (ML) subsystem architecture, in accordance with an embodiment of the invention;

FIG. 3 illustrates a process flow for an adaptive system for dynamic security exposure assessment, in accordance with an embodiment of the invention.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a “user interface” may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, “authentication credentials” may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that “operatively coupled,” as used herein, means that the components may be formed integrally with each other, or may be formed separately and coupled together. Furthermore, “operatively coupled” means that the components may be formed directly to each other, or to each other with one or more components located between the components that are operatively coupled together. Furthermore, “operatively coupled” may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, “operatively coupled” may mean that components may be electronically connected and/or in fluid communication with one another.

As used herein, an “interaction” may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The primary technical problem addressed by this invention is the inefficiency and ineffectiveness of current exposure assessment models in capturing relevant and current information about potential security exposures. The existing process is hindered by several issues: outdated methods for querying public and private sources, lack of comprehensive data capture related to third-party security exposures, and fragmented data sources that complicate the aggregation and analysis of cybersecurity-related information. Furthermore, conventional methods to deploy machine learning models to analyze exposure information and identify exposure vectors are inadequate. This results in a disjointed and inefficient process for dynamically generating and deploying exposure assessment models to evaluate third-party security postures.

Accordingly, the present disclosure provides a technical solution to the aforementioned problems by leveraging an adaptive system specifically designed to improve cybersecurity exposure assessments. The system enhances the relevancy and accuracy of exposure assessments through the following mechanisms: (i) data aggregation—the system queries a variety of public and private sources to capture comprehensive exposure information related to third parties; (ii) adaptive analysis—the system deploys machine learning models on the captured exposure information to identify and analyze key exposure vectors; (iii) dynamic exposure assessment model generation—based on the identified exposure vectors, the system dynamically generates exposure assessment models tailored to the specific security context of the third party; (iv) real-time deployment—the system deploys the exposure assessment models within the third party's network environment to evaluate their security posture continuously; (v) continuous monitoring and pattern recognition—the system tracks and analyzes response patterns over time to detect changes in security controls or emerging vulnerabilities; (vi) compliance notifications—the system provides timely notifications and flagged information for review by subject matter specialists, including alerts on public disclosures of security exposures, detected vulnerabilities, and identified patterns suggesting potential issues with security controls.

What is more, the present disclosure provides a technical solution to a technical problem. As described herein, the technical problem includes the inefficiency and ineffectiveness of conventional exposure assessment models in capturing relevant and current information about potential exposures within a network environment. These models often contain outdated questions, lack specificity regarding individual third-party relationships, and rely on fragmented data sources, which complicates the aggregation and analysis of security-related information. Additionally, conventional methods to track and analyze response patterns from third parties are inadequate, reducing the effectiveness of exposure assessment models. The technical solution presented herein allows for an adaptive machine learning-driven system to dynamically update and manage an exposure assessment model. Embodiments of the invention continuously evaluate the relevancy of security information, identifies emerging exposure vectors, and integrates diverse data sources to provide a comprehensive view of potential exposures. In particular, embodiments of the invention improve the efficiency and accuracy of security assessments by automating the evaluation and updating of exposure information.

The solution is an improvement over existing methods to the described problem. An example system automates the analysis and updating of the exposure assessment model. By integrating and processing data from various sources in real-time, the example system eliminates the need for multiple manual steps typically involved in reviewing and updating exposure assessment models. This reduction in manual steps translates into fewer processing and storage demands on the computing resources, streamlining the entire process. Furthermore, the example system continuously evaluates the exposure information and identifies emerging exposure vectors through advanced machine learning algorithms and quantum computing. In doing so, the example system ensures that the questionnaires are accurate and current with the latest cybersecurity trends, reducing the likelihood of errors that could arise from outdated or irrelevant questions. Consequently, the need for additional resources to correct such errors is minimized. By automating the aggregation and analysis of data, the example system removes the need for extensive manual input. This automation enhances the speed and efficiency of updating exposure assessment models, significantly reducing the time and computing power required to perform these tasks manually, leading to a more efficient use of computing resources and faster identification and mitigation of potential security exposures. Furthermore, the technical solution described herein uses a rigorous, computerized process to perform specific tasks and/or activities that were not previously performed. The example system dynamically adjusts the computational resources needed based on the complexity and volume of the data being processed. Lastly, the technical solution described herein uses a rigorous, computerized process to perform specific tasks and/or activities that were not previously performed. The example system's capability to continuously monitor and update exposure assessment models based on real-time data from diverse sources introduces a level of automation and precision that was not achievable with previous manual methods. In specific implementations, the technical solution bypasses a series of steps previously implemented, thus further conserving computing resources.

FIGS. 1A-1C illustrate technical components of an exemplary distributed computing environment for adaptive system for dynamic security exposure assessment 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file servers, or the like, as well as a range of digital computing devices, including laptops, desktops, video recorders, audio/video players, radios, workstations, and/or the like. Additionally, system 130 may include a variety of auxiliary network devices, encompassing wearable devices, Internet-of-things (IoT) devices, electronic kiosk devices, entertainment consoles, mainframes, and/or the like, in any combination to cater to the complexity and diversity of contemporary digital ecosystems.

The end-point device(s) 140 may encompass an array of electronic devices, such as personal digital assistants, cellular telephones, smartphones, laptops, desktops, and merchant input devices like point-of-sale (POS) systems, electronic payment kiosks, and automated teller machines (ATMs). End-point device(s) 140 may also include edge devices like routers, routing switches, integrated access devices (IAD), and/or the like, and devices capable of interfacing with 5G networks, delivering enhanced data processing and connectivity.

The network 110 may include a distributed network architecture that spans a variety of network types, facilitating a cohesive data communication network that can be managed jointly or individually. The network architecture supports shared communication as well as distributed processing across platforms such as telecommunication networks, local area networks (LAN), wide area networks (WAN), global area networks (GAN), the Internet infrastructure, and/or the like. Network 110 may also integrate emerging networking technologies, including software-defined networking (SDN), network function virtualization (NFV), and next-generation wireless communication standards like 5G. Network 110 may employ secure or unsecure, as well as wireless, wired, and optical interconnection technologies, and/or the like, to accommodate a spectrum of communication and processing needs.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low-speed bus 114 and storage device 110. Each of the components 102, 104, 108, 110, and 112 may be operatively coupled to one another using various buses and may be mounted on a common motherboard or in other manners as appropriate. As described herein, the processor 102 may include several subsystems to execute the portions of processes described herein. Each subsystem may be a self-contained component of a larger system (e.g., system 130) and capable of being configured to execute specialized processes as part of the larger system.

In one example, the data aggregation subsystem may be a self-contained component responsible for querying and capturing exposure information from both public and private sources associated with a third party. The data aggregation subsystem may integrate this captured data into a unified dataset by executing data pre-processing techniques such as data normalization, cleaning, and transformation. The data aggregation subsystem may categorize and tag the data based on predefined criteria, ensuring consistency and reliability. As a specialized component of the larger system, the data aggregation subsystem may periodically re-query sources to maintain current exposure information.

In another example, the machine learning (ML) subsystem may utilize machine learning models to analyze the captured exposure information, as described in more detail in FIG. 2. The ML subsystem may determine a set of exposure vectors for the third party that may be used to generate dynamic exposure assessments. The ML subsystem may continuously update the ML model based on new exposure information, employing techniques like natural language processing (NLP) to analyze textual data. The ML subsystem may function autonomously within the larger system, executing specialized processes to refine and enhance the exposure assessment capabilities.

In yet another example, the exposure assessment subsystem may be configured to generate and deploy exposure assessment models for third parties. The exposure assessment subsystem may use the set of exposure vectors determined by the ML subsystem to create a dynamic assessment of the third party's exposure. The exposure assessment subsystem may deploy these models within the third party's network environment and update existing models with new information. As part of the larger system, the exposure assessment subsystem may ensure accurate and current exposure assessments.

In yet another example, the security control subsystem may be configured to determine appropriate security controls for the third party based on the identified exposure vectors. The security control subsystem may assess whether the third party's exposure meets these security controls and validates them for onboarding if the criteria are met. The security control subsystem may operate as a specialized unit within the larger system, providing essential security validation processes. In yet another example, the notification subsystem may be configured to alert users to changes in the exposure assessment of the third party. In this regard, the notification subsystem may transmit control signals to user devices, prompting alerts when significant changes occur.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low-speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. For instance, the internal and/or external data sources 204, 206, and 208 may include public and private sources associated with a third party. Public sources may comprise regulatory filings and disclosures, publicly available databases, industry reports and publications, news and media outlets, third-party disclosures, and web scraping sources. Public sources provide a wealth of data that can be leveraged to assess the exposure of a third party by analyzing readily accessible information. For example, regulatory filings might offer insights into compliance history, while industry reports could provide context on market positioning and competitive landscape. News and media outlets can shed light on recent events or incidents involving the third party, and web scraping can gather data from various online platforms to provide a comprehensive view of the third party's public exposure. Private sources, on the other hand, may include internal databases or private exposure intelligence feeds. Internal databases might include proprietary information collected through business operations, such as financial records, internal audits, or customer interactions. Private exposure intelligence feeds could be specialized data streams purchased or subscribed to from third-party vendors, offering unique insights not available in the public domain. These feeds might include detailed threat intelligence, confidential industry analyses, or specialized exposure assessments tailored to specific sectors or business activities.

The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, clastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for an adaptive system for dynamic security exposure assessment, in accordance with an embodiment of the invention. As shown in block 302, the public and private sources associated with the third party may be queried. As described herein, public sources may include regulatory filings and disclosures, publicly available databases, industry reports and publications, news and media outlets, third-party disclosures, and web scraping sources. Regulatory filings and disclosures, mandated by government agencies, provide detailed and verified information about a third party's compliance with legal and regulatory requirements. Regular updates and filings ensure the availability of the most recent compliance status, financial performance, and operational changes, may be used for assessing current exposure levels. Publicly available databases, such as those maintained by industry organizations, government bodies, and research institutions, may contain a wealth of information on various entities. These databases may be frequently updated with new data entries, offering insights into the activities and exposure summaries of third parties. Reports and publications from industry analysts and market researchers provide may expert analyses and forecasts. These sources are often regularly updated to reflect the latest market trends, technological advancements, and competitive dynamics, enabling a current view of the third party's industry position and potential exposure. News articles, press releases, and media reports can offer real-time information on recent developments involving third parties. Coverage of events such as data breaches, mergers, acquisitions, regulatory actions, and public controversies can significantly impact the exposure assessment by providing immediate and current information. Information disclosed by third parties themselves, such as annual reports, corporate social responsibility reports, and press releases, may provide direct insights into their operations and strategic directions. Web scraping may involve extracting data from websites and online platforms. Web scraping allows for the collection of vast amounts of real-time information from diverse sources, including social media, forums, blogs, and company websites. The immediacy of web scraping ensures that the most current data is captured for analysis.

Private sources may include internal databases or private exposure intelligence feeds. Internal databases may include data collected through the entity's internal operations, such as transaction records, client interactions, and internal audits. Since this data is generated in real-time or near real-time, it provides a current view of the third party's activities and potential exposures. Private exposure intelligence feeds may include specialized data streams acquired from third-party vendors that may offer unique and confidential insights into potential exposures. Private exposure intelligence feeds may include exposure intelligence, insider information, and exposure assessments that may not be available in public domains. The information from private exposure intelligence feeds may often be updated continuously, providing the latest intelligence on emerging threats and vulnerabilities.

As shown in block 304, capturing exposure information associated with the third party may be based on the querying. Capturing may refer to the collection and aggregation of data obtained from queried sources. As described in more detail in FIG. 2, capturing the exposure information may include retrieving relevant data points that pertain to the third party's exposure from both public and private sources using various methods such as API calls, web scraping, direct database queries, and data import tools. Once retrieved, the data from different sources may be aggregated into a single, unified dataset. This aggregation may involve combining data from disparate sources to create a comprehensive view of the third party's exposure summary. In this regard, the data aggregation subsystem may ensure that data from various sources is appropriately aligned and merged, considering differences in data structures and formats.

In specific embodiments, once the data is aggregated, the data may be subject to pre-processing. For instance, the data may be cleaned (e.g., removing or correcting inaccurate, incomplete, or irrelevant data entries), normalized (e.g., transforming data into a common format to facilitate seamless integration), and transformed (e.g., converting raw data into a format suitable for ML model consumption). After pre-processing, the data may be categorized and tagged based on predefined criteria. This may involve classifying data into relevant categories such as type of exposure (e.g., financial, operational, reputational), severity of exposure, and source reliability. Tagging may further improve the ability to filter and prioritize data during analysis. The pre-processed and categorized data may then be integrated into a central repository structured to support data retrieval and analysis. The integration process may ensure that the data is consistently formatted and easily accessible for the ML subsystem and other components of the exposure assessment system. Alternatively or additionally, the captured data may be stored in a structured format within a database or data warehouse.

In example embodiments, the capturing process may not be static; it may involve continuous updating to incorporate new data as it becomes available, ensuring that the data aggregation subsystem always has the most current and relevant information. Accordingly, the data aggregation subsystem may periodically re-query the sources to update the captured exposure information, reflecting the latest developments and changes in the third party's exposure landscape.

As shown in block 306, deploying an ML model on the captured exposure information involves using machine learning algorithms for analysis. As described in FIG. 2, the ML subsystem may deploy a trained ML model on the exposure information to analyze textual data from public and private sources, providing deeper insights into potential exposure vectors. The ML model may process this textual data to identify patterns and correlations that indicate different types of exposures. For instance, regulatory filings might highlight compliance issues, industry reports could signal market instability, news articles might reveal recent incidents affecting the third party, and internal databases might uncover operational weaknesses. By integrating these diverse data points, the ML model can comprehensively evaluate the third party's exposure summary. In specific embodiments, the ML model may be continuously updated based on new exposure information captured by the data aggregation subsystem. Such a continuous learning capability may allow the model to remain current with emerging trends and new data, enabling the ML model to detect and respond to potential exposures dynamically.

As shown in block 308, determining a set of exposure vectors for the third party using the ML model is based on at least the captured exposure information. Exposure vectors may represent various dimensions of exposure and vulnerability associated with the third party. The ML model may identify patterns and correlations within the data, which may be translated into exposure vectors that may represent the overall security posture of the third party.

As shown in block 310, dynamically generating an exposure assessment model for the third party is based on at least the set of exposure vectors. In this regard, the exposure assessment subsystem may integrate the identified exposure vectors to create a comprehensive model that evaluates the third party's overall exposure summary. In example embodiments, the exposure assessment model may use advanced algorithms to weigh and combine the exposure vectors, considering factors such as the severity of potential exposures, historical data, and the reliability of the source. The exposure assessment subsystem may further incorporate feedback loops and continuous learning mechanisms that allow the model to adjust evaluations based on new information and evolving exposure patterns.

In particular embodiments, the exposure assessment subsystem can update an existing exposure assessment model associated with the third party with the dynamically generated exposure assessment model. In this regard, the exposure assessment subsystem may compare the new exposure assessment model with the existing one, analyzing discrepancies and enhancements. Such a comparison can help identify areas where the exposure summary has changed, whether due to new incidents, regulatory changes, market shifts, or internal developments within the third party. Advanced algorithms and model merging techniques may be employed to reconcile differences between the existing and new exposure assessment models. This may involve weighting recent data more heavily, particularly if it indicates significant changes in the exposure environment. The exposure assessment subsystem may ensure that the updates are accurately reflected while maintaining the integrity of historically stable exposure factors.

As shown in block 312, deploying the exposure assessment model on a network environment associated with the third party may involve integrating the exposure assessment model into the third party's operational framework. This deployment may allow for real-time monitoring and assessment of the third party's security posture within its net work environment.

As shown in block 314, determining an exposure assessment of the third party is based on the deployed exposure assessment model. The assessment may provide a detailed evaluation of the third party's security exposures and vulnerabilities. In cases where there is a change in the exposure assessment of the third party, a notification subsystem may alert users to such a change. In this regard, the notification subsystem may generate control signals that are transmitted to user devices, which may include computers, smartphones, or tablets, as described in FIG. 1. These control signals may trigger alerts that are displayed to users, providing real-time notifications of any alterations in the third party's exposure assessment. Users can configure the notification settings to receive alerts based on specific criteria, such as the severity of the exposure or the type of exposure vector involved. The notification subsystem may ensure that critical information is communicated efficiently, allowing users to take appropriate actions to mitigate potential threats.

In some embodiments, based on the exposure assessment, a security control subsystem may validate the third party for onboarding. The security control subsystem may determine and enforce appropriate security controls by analyzing the identified exposure vectors. In this regard, the security control subsystem may identify relevant security measures and customize them according to the specific exposure summary of the third party. This may involve a thorough evaluation of the third party's current security posture against these controls to ensure compliance with regulatory standards and internal security policies. The security control subsystem may conduct detailed audits and assessments, checking for adherence to industry best practices and organizational requirements. The security control subsystem may also facilitate continuous monitoring and re-evaluation of the third party's security measures, dynamically adjusting controls based on new exposure information and evolving threats. In doing so, the security control subsystem may ensure that the security controls remain effective and relevant over time. Furthermore, the security control subsystem may automate the enforcement of these controls, integrating with other security and IT management systems for seamless implementation.

Embodiments of the present disclosure are described with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for dynamic security exposure assessment, the system comprising:
- a data aggregation subsystem configured to:
  - query public and private sources associated with a third party; and
  - capture exposure information associated with the third party based on at least the querying;
- a machine learning (ML) subsystem operatively coupled to the data aggregation subsystem, and configured to:
  - deploy an ML model on the captured exposure information;
  - determine, using the ML model, a set of exposure vectors for the third party based on at least the exposure information;
- an exposure assessment subsystem operatively coupled to the ML subsystem, and configured to:
  - dynamically generate an exposure assessment model for the third party based on at least the set of exposure vectors;
  - deploy the exposure assessment model on a network environment associated with the third party;
  - determine an exposure assessment of the third party; and
  - generate feedback loops with a continuous learning mechanism to adjust exposure assessment evaluations based on evolving exposure patterns; and
- a security control subsystem operatively coupled to the exposure assessment subsystem, and configured to:
  - determine security controls for the third party based the set of exposure vectors;
  - determine whether the exposure assessment of the third party meets the security controls; and
  - validate the third party for onboarding in an instance in which the exposure assessment meets the security controls.

2. The system of claim 1, wherein the public sources comprise regulatory filings and disclosures, publicly available databases, industry reports and publications, news and media outlets, third-party disclosures, and web scraping sources.

3. The system of claim 1, wherein the private sources comprise at least one of internal databases or private exposure intelligence feeds.

4. The system of claim 1, wherein the data aggregation subsystem is further configured to aggregate and integrate the captured exposure information from the public and private sources into a unified dataset.

5. The system of claim 4, wherein the data aggregation subsystem is further configured to:
- execute data pre-processing techniques on the captured exposure information, wherein the data pre-processing techniques comprises at least one of data normalization, data cleaning, or data transformation, thereby ensuring data consistency across the unified dataset;
- categorize and tag the pre-processed exposure information based on predefined criteria, wherein the predefined criteria comprise at least one of a type of exposure, severity of exposure, or source reliability; and
- store the pre-processed and categorized data in a structured format.

6. The system of claim 1, wherein the ML subsystem is further configured to continuously update the ML model based on new exposure information captured by the data aggregation subsystem.

7. The system of claim 1, further comprising a notification subsystem configured to:
- transmit control signals configured to cause a computing device associated with a user to display an alert indicating changes in the exposure assessment of the third party.

8. The system of claim 1, wherein the ML subsystem is further configured to use natural language processing (NLP) techniques to analyze textual data from the public and private sources.

9. The system of claim 1, wherein the data aggregation subsystem is further configured to periodically re-query the public and private sources to update the captured exposure information.

10. The system of claim 1, wherein the exposure assessment subsystem is further configured to update an existing exposure assessment model associated with the third party with the dynamically generated exposure assessment model.

11. A computer program product for dynamic security exposure assessment, the computer program product comprising a non-transitory computer-readable medium comprising code configured to cause an apparatus to:
- query public and private sources associated with a third party;
- capture exposure information associated with the third party based on at least the querying;
- deploy an ML model on the captured exposure information;

determine, using the ML model, a set of exposure vectors for the third party based on at least the exposure information;

dynamically generate an exposure assessment model for the third party based on at least the set of exposure vectors;

deploy the exposure assessment model on a network environment associated with the third party;

determine an exposure assessment of the third party;

generate feedback loops with a continuous learning mechanism to adjust exposure assessment evaluations based on evolving exposure patterns;

determine security controls for the third party based the set of exposure vectors;

determine whether the exposure assessment of the third party meets the security controls; and validate the third party for onboarding in an instance in which the exposure assessment meets the security controls.

12. The computer program product of claim 11, wherein public sources comprise regulatory filings and disclosures, publicly available databases, industry reports and publications, news and media outlets, third-party disclosures, and web scraping sources.

13. The computer program product of claim 11, wherein the private sources comprise at least one of internal databases or private exposure intelligence feeds.

14. The computer program product of claim 11, wherein the code further causes the apparatus to aggregate and integrate the captured exposure information from the public and private sources into a unified dataset.

15. A method for dynamic security exposure assessment, the method comprising:

querying public and private sources associated with a third party;

capturing exposure information associated with the third party based on at least the querying;

deploying an ML model on the captured exposure information;

determining, using the ML model, a set of exposure vectors for the third party based on at least the exposure information;

dynamically generating an exposure assessment model for the third party based on at least the set of exposure vectors;

deploying the exposure assessment model on a network environment associated with the third party;

determining an exposure assessment of the third party;

generating feedback loops with a continuous learning mechanism to adjust exposure assessment evaluations based on evolving exposure patterns;

determining security controls for the third party based the set of exposure vectors;

determining whether the exposure assessment of the third party meets the security controls; and validating the third party for onboarding in an instance in which the exposure assessment meets the security controls.

16. The method of claim 15, wherein public sources comprise regulatory filings and disclosures, publicly available databases, industry reports and publications, news and media outlets, third-party disclosures, and web scraping sources.

17. The method of claim 15, wherein the private sources comprise at least one of internal databases or private exposure intelligence feeds.

* * * * *